US010205193B2

(12) United States Patent
Izumi et al.

(10) Patent No.: US 10,205,193 B2
(45) Date of Patent: Feb. 12, 2019

(54) LEAD ACID BATTERY

(71) Applicant: GS Yuasa International Ltd., Kyoto-shi, Kyoto (JP)

(72) Inventors: Kenji Izumi, Shizuoka (JP); Yoshinobu Sato, Shizuoka (JP); Etsuko Ogasawara, Shizuoka (JP); Takeshi Chiba, Shizuoka (JP); Yu Kojima, Shizuoka (JP); Kazuhiro Sugie, Shizuoka (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/549,867

(22) PCT Filed: Dec. 4, 2015

(86) PCT No.: PCT/JP2015/006024
§ 371 (c)(1),
(2) Date: Aug. 9, 2017

(87) PCT Pub. No.: WO2016/129021
PCT Pub. Date: Aug. 18, 2016

(65) Prior Publication Data
US 2018/0026310 A1  Jan. 25, 2018

(30) Foreign Application Priority Data
Feb. 12, 2015  (JP) .................................. 2015-024894

(51) Int. Cl.
*H01M 4/13* (2010.01)
*H01M 10/12* (2006.01)
(Continued)

(52) U.S. Cl.
CPC ............. *H01M 10/12* (2013.01); *H01M 4/14* (2013.01); *H01M 4/62* (2013.01); *H01M 4/625* (2013.01);
(Continued)

(58) Field of Classification Search
CPC .......... H01M 10/12; H01M 4/14; H01M 4/62; H01M 4/625; H01M 4/68; H01M 4/685;
(Continued)

(56) References Cited

U.S. PATENT DOCUMENTS

2004/0142243 A1*  7/2004  Furukawa ............... C22C 11/06
429/245
2004/0187986 A1   9/2004  Schaeffer
(Continued)

FOREIGN PATENT DOCUMENTS

CN    104067436    9/2014
JP    61203568 A2  9/1986
(Continued)

OTHER PUBLICATIONS

International Search Report dated Mar. 1, 2016 filed in PCT/JP2015/006024.
(Continued)

*Primary Examiner* — Raymond Alejandro
(74) *Attorney, Agent, or Firm* — Rankin, Hill & Clark LLP

(57) ABSTRACT

A lead acid battery including: a positive electrode plate including a positive electrode grid and a positive electrode active material; a negative electrode plate including a negative electrode grid and a negative electrode active material; an electrode plate group including the positive electrode plate, the negative electrode plate, and a separator interposed between the positive electrode plate and the negative electrode plate; a battery container including a plurality of cell
(Continued)

chambers each accommodating the electrode plate group and an electrolyte; and a lid sealing an opening of the battery container. A ratio P/N of mass P of the positive electrode active material to mass N of the negative electrode active material is 1.25 or more and 1.65 or less. The negative electrode grid contains bismuth in an amount of 1 ppm or more and 300 ppm or less.

4 Claims, 2 Drawing Sheets

(51) Int. Cl.
    *H01M 4/14*     (2006.01)
    *H01M 4/73*     (2006.01)
    *H01M 4/62*     (2006.01)
    *H01M 4/68*     (2006.01)
    *F02N 11/08*     (2006.01)
    *H01M 4/02*     (2006.01)

(52) U.S. Cl.
    CPC .............. *H01M 4/68* (2013.01); *H01M 4/685* (2013.01); *H01M 4/73* (2013.01); *F02N 11/0862* (2013.01); *H01M 2004/027* (2013.01); *H01M 2004/028* (2013.01); *Y02E 60/126* (2013.01)

(58) Field of Classification Search
    CPC ............. H01M 4/73; H01M 2004/027; H01M 2004/028; F02N 11/0862; Y02E 60/126
    See application file for complete search history.

(56) References Cited

U.S. PATENT DOCUMENTS

| 2008/0233482 | A1* | 9/2008 | Prengaman | C22C 11/06 |
|---|---|---|---|---|
| | | | | 429/245 |
| 2009/0061290 | A1 | 3/2009 | Anzai et al. | |
| 2014/0329148 | A1 | 11/2014 | Izumi | |

FOREIGN PATENT DOCUMENTS

| JP | 4296464 | A2 | 10/1992 |
| JP | 200487248 | | 3/2004 |
| JP | 2006114417 | A2 | 4/2006 |
| JP | 2006294290 | A2 | 10/2006 |
| JP | 2010192162 | A2 | 9/2010 |
| JP | 201373716 | | 4/2013 |
| JP | 5587523 | B1 | 9/2014 |
| WO | 2012043331 | A1 | 4/2012 |

OTHER PUBLICATIONS

Chinese Office Action dated Nov. 27, 2018 issued in the corresponding Chinese Patent Application No. 201580073074.0.

* cited by examiner

[Fig.1]
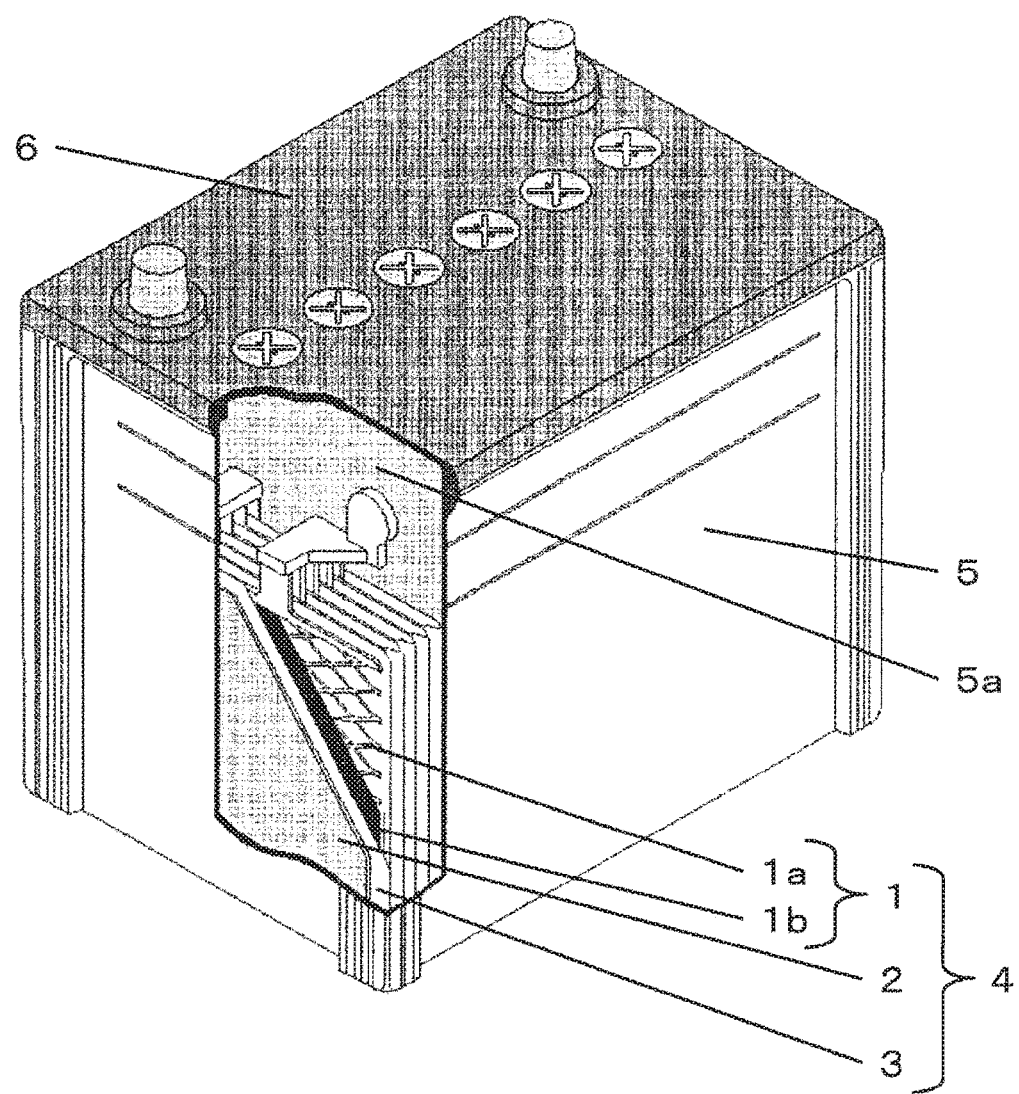

[Fig.2]
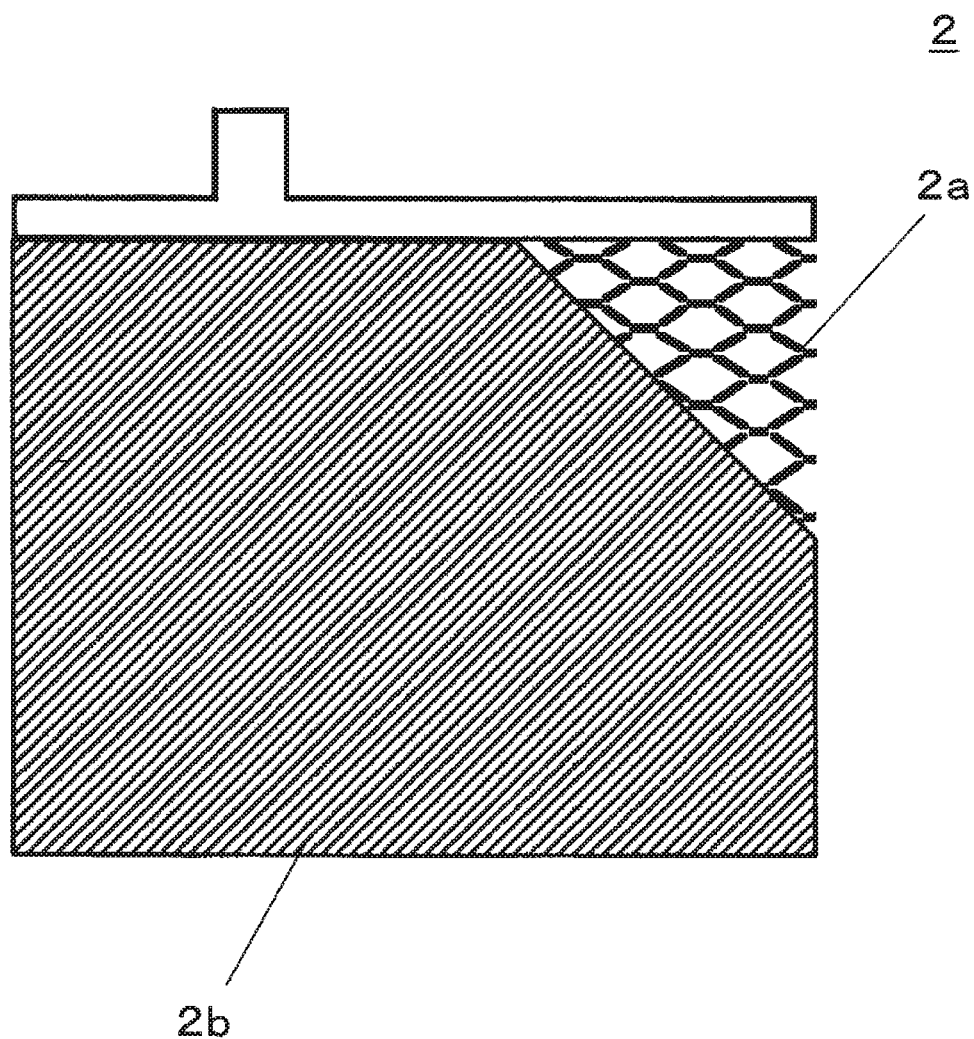

LEAD ACID BATTERY

TECHNICAL FIELD

The present invention relates to a lead acid battery for car starter.

BACKGROUND ART

Among lead acid car starter batteries, a lead acid battery to be mounted in cars equipped with idling stop system is supposed to be deeply discharged to a relatively low state-of-charge (SOC) region, and therefore, required to have durability against repeated deep discharge. Patent Literature 1 discloses a technique of optimizing the mass ratio between positive and negative electrode active materials, on the basis of the results of cycle life test conducted after batteries are overdischarged. Patent Literature 2, in order to improve the cycle life characteristics under more practical idling stop conditions, discloses likewise a technique of optimizing the mass ratio between positive and negative electrode active materials. The optimum range of the P/N ratio of mass P of positive electrode active material to mass N of negative electrode active material is from 0.77 to 1.43 in Patent Literature 1, and from 0.91 to 1.43 in Patent Literature 2.

CITATION LIST

Patent Literature

[PTL 1] Japanese Laid-Open Patent Publication No. 2006-114417
[PTL 2] Japanese Patent Publication No. 5587523

SUMMARY OF INVENTION

Technical Problem

In recent years, cars equipped with idling stop system have been getting more and more popular, and in association therewith, there occur some cases where the lead acid battery mounted in those cars is operated under more severe conditions for the battery than those as originally assumed at the time of development. Under such circumstances, it is often observed that the cycle life characteristics cannot be sufficiently exerted even by employing the techniques of Patent Literatures 1 and 2, when the battery is actually car-mounted and subjected to repeated deep discharge.

The present invention is made in view of the above problems, and aims to provide a highly reliable lead acid battery that can sufficiently exert its cycle life characteristics, even when operated under comparatively severe conditions of idling stop control.

Solution to Problem

One aspect of the present invention relates to a lead acid battery including: a positive electrode plate including a positive electrode grid and a positive electrode active material; a negative electrode plate including a negative electrode grid and a negative electrode active material; an electrode plate group including the positive electrode plate, the negative electrode plate, and a separator interposed between the positive electrode plate and the negative electrode plate; a battery container including a plurality of cell chambers each accommodating the electrode plate group and an electrolyte; and a lid sealing an opening of the battery container. A ratio P/N of mass P of the positive electrode active material to mass N of the negative electrode active material is 1.25 or more and 1.65 or less. The negative electrode grid contains bismuth in an amount of 1 ppm or more and 300 ppm or less.

In a preferable embodiment, the ratio P/N is more than 1.43 and 1.65 or less.

In a preferable embodiment, the ratio P/N is 1.25 or more and 1.43 or less, and the negative electrode active material contains carbon in an amount of 0.10 mass % or more and 0.45 mass % or less.

In a preferable embodiment, a liquid level of the electrolyte is above a top of the electrode plate group.

Advantageous Effects of Invention

According to the present invention, it is possible to provide a highly reliable lead acid battery that can sufficiently exert its cycle life characteristics, even when operated under comparatively severe conditions of idling stop control.

BRIEF DESCRIPTION OF DRAWINGS

FIG. 1 A schematic general view of a lead acid battery of the present invention.
FIG. 2 An illustration of an example of an essential part of the lead acid battery of the present invention.

DESCRIPTION OF EMBODIMENT

An embodiment of the present invention is described below, with reference to drawings.

FIG. 1 is a schematic general view of a lead acid battery of the present invention, and FIG. 2 is an illustration of an example of a negative electrode plate, which is an essential part of the lead acid battery of the present invention. A plurality of electrode plate groups 4 each including a positive electrode plate 1, a negative electrode plate 2, and a separator 3 interposed therebetween are placed in a battery container 5 which has a plurality of cell chambers 5a and contains an electrolyte (not shown). The opening of the battery container 5 is sealed with a lid 6. The positive electrode plate 1 includes a positive electrode grid 1a and a positive electrode active material 1b. The negative electrode plate 2 includes a negative electrode grid 2a and a negative electrode active material 2b.

The present invention includes two features. The first is that a ratio P/N of mass P of the positive electrode active material 1b to mass N of the negative electrode active material 2b is 1.25 or more and 1.65 or less. The second is that the negative electrode grid 2a contains bismuth in an amount of 1 ppm or more and 300 ppm or less.

As the problem associated with idling stop control, Patent Literature 1 envisages that the lead acid battery is overdischarged, and Patent Literature 2 envisages that the lead acid battery is subjected to repeated quick charge and comparatively deep discharge. On the other hand, among the cars equipped with idling stop system, an increasing number of them have been employing a control method of generating a regenerative current at the time of braking and the like and charging the lead acid battery with the regenerative current. In order to achieve more efficient charging with the regenerated current, it is desirable to keep the SOC of the lead acid battery relatively low (so as not to be fully charged). Under such circumstances, even by employing the configurations of the lead acid battery as disclosed in Patent Literatures 1 and 2, which are optimized assuming a control to charge the battery to the full even for a short moment, satisfactory battery performance cannot be exerted.

Specially, as the battery is charged and discharged repeatedly under the condition where the SOC is below 100%, a phenomenon called acid stratification occurs, i.e., the sulfate ion concentration in the electrolyte becomes smaller in the upper layer portion than in the lower layer portion. When this occurs, in the upper layer portion where the sulfate ion concentration is relatively depleted, lead sulfate as a discharge product is unlikely to be produced (discharge is difficult to proceed). On the other hand, in the lower layer portion where the sulfate ion concentration is relatively in excess, sulfate ions are unlikely to be dissociated from the lead sulfate (charge is difficult to proceed). Due to this unbalance, the lead sulfate present in excess in the lower layer portion deposits, slowing down the discharge reaction as a whole. This results in deterioration in cycle life characteristics. The stratification is eliminated when the electrolyte is agitated by the gas generated through hydrolysis of electrolyte (gas generation) that occurs in the terminal stage of charging. Under the condition where the SOC is intentionally controlled to below 100%, however, charging cannot proceed to the terminal stage, and the above effect cannot be expected.

To solve this problem, the present invention employs the above-described two features.

The first feature is that the ratio P/N of mass P of the positive electrode active material 1b to mass N of the negative electrode active material 2b is 1.25 or more and 1.65 or less. Conventionally, the ratio P/N has been adjusted to below 1.25, thereby to ensure charging performance, while maintaining a predetermined battery capacity. When, however, charging is performed in the control as above in which the SOC is kept relatively low (a full charge is not reached), although improvement in the charging efficiency can be expected because no overcharge occurs, the SOC significantly drops during frequently repeated charge and discharge in the idling stop control, and this leads to a deterioration mode in which the positive electrode active material 1b softens and separates from the positive electrode plate 1. Dealing with this new charging control method requires a new design concept: to significantly increase the amount of the positive electrode active material 1b, relative to the negative electrode active material 2b, so that the exposure of the positive electrode active material 1b to a low SOC region can be avoided, and thus the separation of the positive electrode active material, due to softening, from the positive electrode plate 1 can be prevented. As a result of intensive studies, the inventors have found that this effect becomes remarkable by setting the ratio P/N to 1.25 or more. Setting the ratio P/N to above 1.65, however, leads to insufficient charging due to the lack of the negative electrode active material 2b, resulting conversely in deterioration in cycle life characteristics.

Although the above effect obtained by the first feature is remarkable when the ratio P/N is above 1.43, it can also be remarkable when the ratio P/N is 1.25 or more and 1.43 or less, by including carbon in the negative electrode active material 2b in an amount of 0.10 mass % or more and 0.45 mass % or less. Due to the carbon which does not get involved in charge and discharge and is distributed appropriately on the surface of the negative electrode plate 2, the gas generation through hydrolysis can be facilitated, in parallel with the charging reaction. This, in synergy with the effect obtained by adding an appropriate amount of bismuth to the negative electrode grid 2a, can more vigorously agitate the electrolyte, promoting the elimination of the stratification. As a result, the charge/discharge reaction at the positive electrode plate 1 can proceed homogeneously. Therefore, even though the battery is configured to have the ratio P/N being 1.25 or more and 1.43 or less, i.e., configured such that, upon the loss of reaction homogeneity at the positive electrode plate 1, the battery reaches a SOC region where the positive electrode active material 1b softens locally, it can be controlled so as not to reach the SOC region where the positive electrode active material 1b softens locally. It is to be noted that when the amount of the carbon contained in the negative electrode active material 2b is below 0.10 mass %, the above effect is not sufficient; and when above 0.45 mass %, hydrolysis proceeds somewhat excessively, and the amount of electrolyte is reduced, resulting in a slight deterioration in the cycle life characteristics.

The second feature is that bismuth is contained in the negative electrode grid 2a in an amount of 1 ppm or more and 300 ppm or less. The presence of an appropriate amount of bismuth in the negative electrode grid 2a decreases the hydrogen overvoltage, and hydrogen gas tends to be generated even though the SOC is below 100%, allowng the diffusion of the electrolyte to easily occur. This, as a result, can eliminate the stratification. In order to obtain this effect, it is necessary to include bismuth in the negative electrode gird 2a in an amount of 1 ppm or more. When the amount exceeds 300 ppm, however, the hydrogen overvoltage will be decreased too much, and the hydrolysis of electrolyte occurs excessively, reducing the electrolyte significantly. This accelerates the corrosion of tab-shape current collecting portions (tabs) exposed out of the electrolyte of the positive and negative electrode plates 1 and 2, resulting conversely in deterioration in the cycle life characteristics.

According to the present invention configured to include the above-described two features, it is possible to provide a lead acid battery that can sufficiently exert its life characteristics even charged and discharged repeatedly under the condition where the SOC is below 100%.

The effect of the present invention is remarkable in a lead acid battery for car starter, more specifically, in a liquid-type lead acid battery in which the liquid level of the electrolyte is above the top of the electrode plate groups 4.

In the present invention, the P/N ratio of mass P of the positive electrode active material 1b to mass N of the negative electrode active material 2b, and the mass ratio of the carbon included in the negative electrode active material 2b are defined, supposing that the SOC is 100%. More specifically, the mass ratio in the present invention refers to a mass ratio in a lead acid battery which is intentionally charged until the SOC reaches 100% (for example, by using another power supply) before mounted in a car or in an initial state for car starter.

The effects of the present invention will now be described below with reference to Examples.

(1) Fabrication of Lead Acid Battery

A D26L-size lead acid battery specified in JIS D5301 was fabricated in the present Example as a lead acid battery 1 having cell chambers 5a each accommodating seven positive electrode plates 1 and eight negative electrode plates 2, with the negative electrode plates 2 each placed inside a bag-shaped separator 3 made of polyethylene.

The positive electrode plate 1 was obtained by kneading a lead oxide powder with sulfuric acid and purified water, to prepare a precursor paste of a positive electrode active material 1b, and filling the paste into a positive electrode grid 1a (expanded grid) made of a lead alloy sheet (thickness: 1.1 mm) containing calcium.

The negative electrode plate 2 was obtained by: adding carbon and an organic additive to a lead oxide powder, and kneading the powder with sulfuric acid and purified water, to prepare a precursor paste of a negative electrode active material 2b; and filling the paste into a negative electrode grid 2a (expanded grid) made of a lead alloy sheet (thickness: 1.1 mm) containing calcium and, depending on the condition, bismuth.

The mass ratio of the bismuth contained in the negative electrode grid 2a was varied as shown in Table 1. Likewise, the mass ratio of the carbon occupying the negative electrode active material 2b, and the P/N ratio of mass P of the positive electrode active material 1b to mass N of the negative electrode active material 2b were also varied as shown in Table 1, with the SOC adjusted to 100%.

The obtained positive and negative electrode plates 1 and 2 were aged and dried. Afterwards, the negative electrode plates 2 were each placed inside the bag-shaped separator 3 made of polyethylene, and stacked on the positive electrode plates 2 alternately one on another, to obtain an electrode plate group 4 comprising seven positive electrode plates 1 and eight negative electrode plates 2 stacked alternately one on another with the separator 3 therebetween. The electrode plate group 4 was placed into each of six cell chambers 5a divided by a partition, and six cells were directly connected to each other. Subsequently, an electrolyte comprising a dilute sulfuric acid having a density of 1.28 g/cm$^3$ was injected to perform chemical formation. A lead acid battery was thus produced.

(2) Life Characteristics

The fabricated lead acid batteries, after the SOC was adjusted to 90%, were evaluated by following the steps below.
A. Subjecting battery to discharging at 45 A for 59 seconds
B. Subjecting battery to discharging at 300 A for 1 second
C. Subjecting battery to 14.0 V constant-voltage charging for 60 seconds with maximum current limited to 100 A
D. After 3600-times repetition of a charge-discharge cycle consisting of A, B and C performed in this order, subjecting battery to refresh charging, i.e., 14.0 V constant-voltage charging for 30 minutes with maximum current limited to 50 A
E. After allowing battery to stand for 48 hours, adjusting SOC to 90% again.

The above A to B steps were repeated, and when the discharge voltage dropped below 7.2 V, the battery was judged as having reached the end of the life. Based on this judgment, it was decided every 3600 cycles whether or not to continue the test. The number of cycles performed until it was decided not to continue is shown in Table 1, together with the constitution conditions.

TABLE 1

| Battery | Ratio P/N | Bismuth in negative electrode grid (ppm) | Carbon in negative electrode active material (mass %) | Cycle life characteristics |
|---|---|---|---|---|
| A-1 | 1.21 | 150 | 0.05 | 46,800 |
| A-2 | 1.25 | 150 | 0.05 | 68,400 |
| A-3 | 1.34 | 150 | 0.05 | 72,000 |
| A-4 | 1.43 | 150 | 0.05 | 72,000 |
| A-5 | 1.45 | 150 | 0.05 | 82,800 |
| A-6 | 1.55 | 150 | 0.05 | 100,800 |
| A-7 | 1.65 | 150 | 0.05 | 79,200 |
| A-8 | 1.69 | 150 | 0.05 | 50,400 |
| B-1 | 1.55 | 0.5 | 0.05 | 50,400 |
| B-2 | 1.55 | 1 | 0.05 | 68,400 |
| B-3 | 1.55 | 10 | 0.05 | 79,200 |
| B-4 | 1.55 | 50 | 0.05 | 93,500 |
| B-5 | 1.55 | 150 | 0.05 | 100,800 |
| B-6 | 1.55 | 200 | 0.05 | 93,600 |
| B-7 | 1.55 | 250 | 0.05 | 82,800 |
| B-8 | 1.55 | 300 | 0.05 | 72,000 |
| B-9 | 1.55 | 330 | 0.05 | 50,400 |
| C-1 | 1.25 | 150 | 0.05 | 68,400 |
| C-2 | 1.25 | 150 | 0.10 | 79,200 |
| C-3 | 1.25 | 150 | 0.30 | 93,600 |
| C-4 | 1.25 | 150 | 0.45 | 79,200 |
| C-5 | 1.25 | 150 | 0.50 | 72,000 |
| D-1 | 1.34 | 150 | 0.05 | 72,000 |
| D-2 | 1.34 | 150 | 0.10 | 82,800 |
| D-3 | 1.34 | 150 | 0.30 | 93,600 |
| D-4 | 1.34 | 150 | 0.45 | 82,800 |
| D-5 | 1.34 | 150 | 0.50 | 72,000 |
| E-1 | 1.43 | 150 | 0.05 | 72,000 |
| E-2 | 1.43 | 150 | 0.10 | 82,800 |
| E-3 | 1.43 | 150 | 0.30 | 93,600 |
| E-4 | 1.43 | 150 | 0.45 | 82,800 |
| F-5 | 1.43 | 150 | 0.50 | 68,400 |
| F-1 | 1.45 | 150 | 0.05 | 82,800 |
| F-2 | 1.45 | 150 | 0.10 | 90,000 |
| F-3 | 1.45 | 150 | 0.30 | 93,600 |
| F-4 | 1.45 | 150 | 0.45 | 86,400 |
| F-5 | 1.45 | 150 | 0.50 | 79,200 |

Comparison was made among batteries A-1 to A-8. Battery A-1 having a ratio P/N below 1.25 and battery A-8 having a ratio P/N above 1.65 were both inferior in the cycle life characteristics. These batteries were disassembled, and it was observed that: in battery A-1, the positive electrode active material 1b softened and separated; and in battery A-8, charging did not proceed sufficiently. This shows that the ratio P/N is appropriately 1.25 or more and 1.65 or less, and preferably more than 1.43 and 1.65 or less.

Comparison was made among batteries B-1 to B-9. Battery B-1 in which the amount of bismuth contained in the negative electrode grid 2a was less than 1 ppm, and battery B-9 in which the amount of bismuth was more than 300 ppm were both inferior in the cycle life characteristics. These batteries were disassembled, and it was observed that: in battery B-1, the stratification of the electrolyte occurred severely; and in battery B-9, the electrolyte was extremely reduced. This shows that the amount of bismuth contained in the negative electrode grid 2a is appropriately 1 ppm or more and 300 ppm or less.

Having considered the evaluation results of batteries A-1 to A-8, along with those of batteries B-1 to B-9, it would be understood that both the ratio P/N and the amount of bismuth contained in the negative electrode grid 2a should be adjusted within the appropriate range.

Batteries C-1 to C-5 were configured such that, with the ratio P/N fixed at 1.25 and the amount of bismuth in the negative electrode grid 2a fixed at 150 ppm, the amount of carbon contained in the negative electrode active material 2b was varied from 0.05 mass % to 0.50 mass %. Batteries D-1 to D-5 were configured in the same manner as Batteries C-1 to C-5, respectively, except that the ratio P/N was fixed at 1.34. Batteries E-1 to E-5 were configured in the same manner as Batteries C-1 to C-5, respectively, except that the ratio P/N was fixed at 1.43. Batteries F-1 to F-5 were configured in the same manner as Batteries C-1 to C-5, respectively, except that the ratio P/N was fixed at 1.45. Comparison was made among these batteries.

When the ratio P/N is within the range of 1.25 to 1.43, containing carbon in the negative electrode active material 2b in an amount of 0.10 mass % or more and 0.45 mass % or less resulted in better cycle life characteristics than containing carbon in the negative electrode active material 2b in the amount of 0.05 mass %. This is presumably because the addition of an appropriate amount of carbon facilitated the gas generation through hydrolysis, and due to this, the stratification was eliminated. Increasing the amount of carbon contained in the negative electrode active material 2b to greater than 0.45 mass %, however, did not result in better cycle life characteristics. This is presumably because hydrolysis proceeded somewhat excessively, tending to reduce the electrolyte.

The above tendency is uniquely observed when the ratio P/N is within the range of 1.25 to 1.43. This is presumably for the following reason. When the ratio P/N is 1.25 or more and 1.43 or less, upon the loss of reaction homogeneity at the positive electrode plate 1, the battery reaches a SOC region where the positive electrode active material 1b softens locally. Within this range, the effect obtained by adding an appropriate amount of carbon in the negative electrode active material 2b becomes remarkable. When the ratio P/N exceeds 1.43, the battery can remain relatively far away from the SOC region where the positive electrode active material 1b softens locally.

Although the present invention was described above by way of preferable embodiments, they should not be construed as limiting the scope of the invention, and various variations are possible. For example, the positive electrode rid 1a, like the negative electrode grid 2a, may contain bismuth in an amount of 1 ppm or more and 300 ppm or less.

INDUSTRIAL APPLICABILITY

The present invention is useful in a lead acid battery to be mounted in cars equipped with idling stop system.

REFERENCE SIGNS LIST

1: positive electrode plate
1a: positive electrode grid
1b: positive electrode active material
2: negative electrode plate
2a: negative electrode grid
2b: negative electrode active material
3: separator
4: electrode plate group
5: battery container
5a: cell chamber
6: lid

The invention claimed is:

1. A lead acid battery comprising:
   a positive electrode plate including a positive electrode grid and a positive electrode active material;
   a negative electrode plate including a negative electrode grid and a negative electrode active material;
   an electrode plate group including the positive electrode plate, the negative electrode plate, and a separator interposed between the positive electrode plate and the negative electrode plate;
   a battery container including a plurality of cell chambers each accommodating the electrode plate group and an electrolyte; and
   a lid sealing an opening of the battery container;
   a ratio P/N of mass P of the positive electrode active material to mass N of the negative electrode active material being 1.25 or more and 1.65 or less,
   the negative electrode grid containing bismuth in an amount of 1 ppm or more and 300 ppm or less.

2. The lead acid battery of claim 1, wherein the ratio P/N is more than 1.43 and 1.65 or less.

3. The lead acid battery of claim 1, wherein the ratio P/N is 1.25 or more and 1.43 or less, and the negative electrode active material contains carbon in an amount of 0.10 mass % or more and 0.45 mass % or less.

4. The lead acid battery of claim 1, wherein a liquid level of the electrolyte is above a top of the electrode plate group.

* * * * *